United States Patent [19]

Jamieson

[11] Patent Number: 5,016,669

[45] Date of Patent: May 21, 1991

[54] VALVE ASSEMBLY

[75] Inventor: Richard A. Jamieson, Horseheads, N.Y.

[73] Assignee: Dresser-Rand Company, Corning, N.Y.

[21] Appl. No.: 532,846

[22] Filed: Jun. 4, 1990

[51] Int. Cl.$^5$ .............................................. F16K 15/16
[52] U.S. Cl. ..................................... 137/512; 137/856; 137/857; 417/566; 417/571
[58] Field of Search ...................... 137/512, 512.4, 855, 137/856, 857; 417/560, 566, 569, 571

[56] References Cited

U.S. PATENT DOCUMENTS

| | | | |
|---|---|---|---|
| 2,000,735 | 5/1935 | Arnold | 417/571 X |
| 3,059,665 | 10/1962 | Cobb | 137/512 |
| 4,181,477 | 1/1980 | Litt | 137/512.4 X |
| 4,437,490 | 3/1984 | Demers | 137/512.4 |
| 4,646,781 | 3/1987 | McIntyre | 137/512.4 |
| 4,776,776 | 10/1988 | Jones | 137/512.4 X |

FOREIGN PATENT DOCUMENTS

| | | | |
|---|---|---|---|
| 2115644 | 10/1972 | Fed. Rep. of Germany | 417/566 |
| 2357578 | 5/1975 | Fed. Rep. of Germany | 417/571 |
| 997033 | 12/1951 | France | 137/857 |

Primary Examiner—Robert G. Nilson
Attorney, Agent, or Firm—Bernard J. Murphy

[57] ABSTRACT

The valve assembly comprises a body formed of substantially identical, or identical plates, in which one is the mirror-image or reverse of the other. The plates are held apart, in parallel planes, by an enveloping seal. Each plate is ported for the conduct of fluid therethrough in cooperation with a fluid-conducting void formed in the confronting plate. Flapper-type valving elements are confined within the body, between the plates. A single, centrally-disposed fastener secures the plates and the assembly together, and constitutes the means for the simple disassembly of the unit.

7 Claims, 1 Drawing Sheet

VALVE ASSEMBLY

This invention pertains to valve assemblies, such as are used in fluid-handling machines, to control fluid inlet and discharge, and in particular to a novel valve assembly, for a fluid-handling machine, of simple construction and offering ease or assembly and maintenance.

In the prior art, inlet and discharge valves are commonly of differing configurations, and require distinct machining and discrete components. This complicates supply and stocking requirements which, of course, cause undue expense.

What has been sought is a valve assembly of uncomplicated design, having few component parts, offering both inlet and discharge control, and which accommodates facile disassembly and maintenance.

It is an object of this invention to set forth just such a sought valve assembly.

It is particularly an object of this invention to disclose a valve assembly, for a fluid-handling machine, comprising a valve body; said body having inlet and discharge ports formed therein; and valving elements confined within said body; wherein said body comprises a pair of substantially identical plates coupled together.

Further objects of this invention, as well as the novel features thereof, will become more apparent by reference to the following description, taken in conjunction with the accompanying figures, in which.

Figure 4:
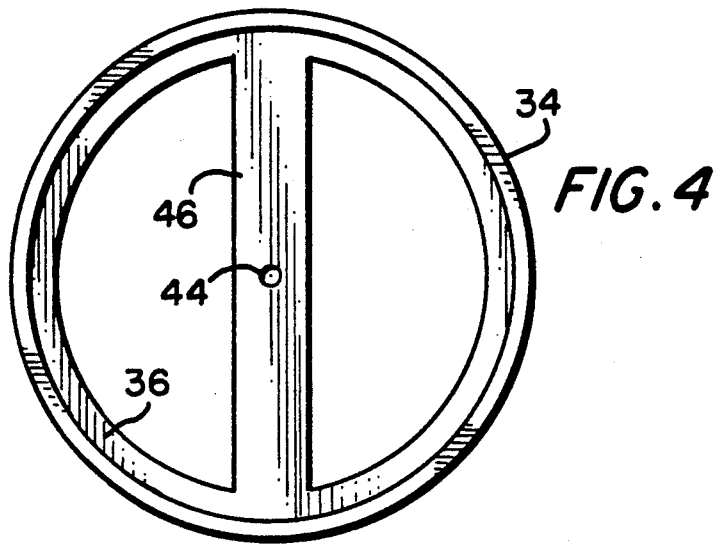
FIG. 4 shows a plan view, in much smaller scale than FIGS. 1-3, of the seal used in the aforesaid embodiments.

As shown in the figures, a first embodiment of the novel valve assembly 10 comprises a body 12 constructed from a pair of plates 14 and 16 which are substantially identical. Each of the plates 14 and 16 has a port and a void formed therein. Plate 14 has an inlet port 18, and plate 16 has a discharge port 20, and both have voids 22 formed therein. Each plate further has a tapped hole 24 formed therein in which to receive a valving element-keeper screw 26. In each plate, there is formed a ramp surface 28 at one side of the void(s) 22. Identical valving elements 30 are interposed between the plates 14 and 16, each thereof having an aperature 32 formed therein which receives the unthreaded shank end of the screw(s) 26. The plates are spaced apart, each occupying a separate plane, by means of an annular seal 34 which has an inner lip 36 which is disposed between the plates 14 and 16. Springs 38 are set about the screws 26, and between the valving elements 30 and the associated plate 14 or 16 to urge the elements 30 against the other of the plates. A center bolt 40 is set in a hole 42 formed in the center of plate 14, through a hole 44 formed in a transverse portion 46 of the seal 34, and is fastened into a tapped hole 48 formed in the center of plate 16. Bolt 40 secures the plates together and the valve assembly 10 duly assembled for use.

Figure 1:
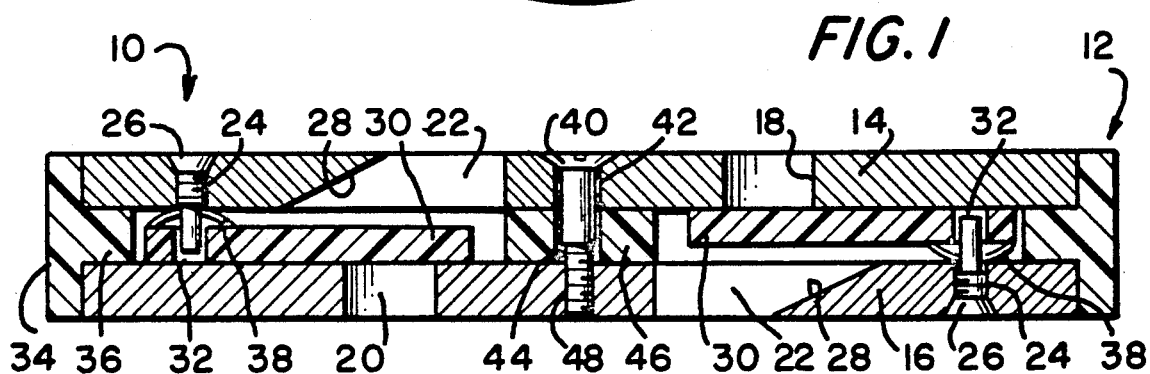
FIG. 1 is a cross-sectional view, taken through a diameter of the novel valve, according to an embodiment thereof.

By way of example, it will be assumed that plate 16 is set in or on a cylinder in confronting relationship to a reciprocating piston. In the circumstances, as the piston withdraws from the valve assembly it will draw down a relative vacuum causing the valving element 30, which is to the right in FIG. 1, to bend onto the ramp surface 28 thereunder, and open an inlet pathway between port 18 and void 22. Conversely, port 20 will be closed as the negative pressure will cause the valving element 30 which is to the left in FIG. 1 to close off port 20. As the piston reverses and closes toward the valve assembly, the reverse of the aforesaid will occur; port 20 will open, and port 18 will close.

It can be appreciated that plates 14 and 16 are substantially identical, one being disposed as the mirror image of the other, except for the provisioning for the center bolt 40. Plate 14 has a simple hole 42 for the bolt, and plate 16 has the tapped hole 48 for the bolt 40. Clearly, however, plate 16 could be used as a plate 14 simply by re-drilling and countersinking the hole 48.

Figure 2:
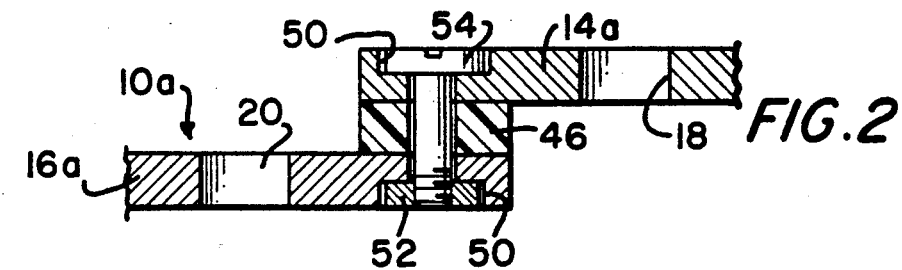
FIG. 2 is a view like that of FIG. 1, albeit showing only a portion of the novel valve assembly, according to an alternative embodiment thereof.
Figure 3:
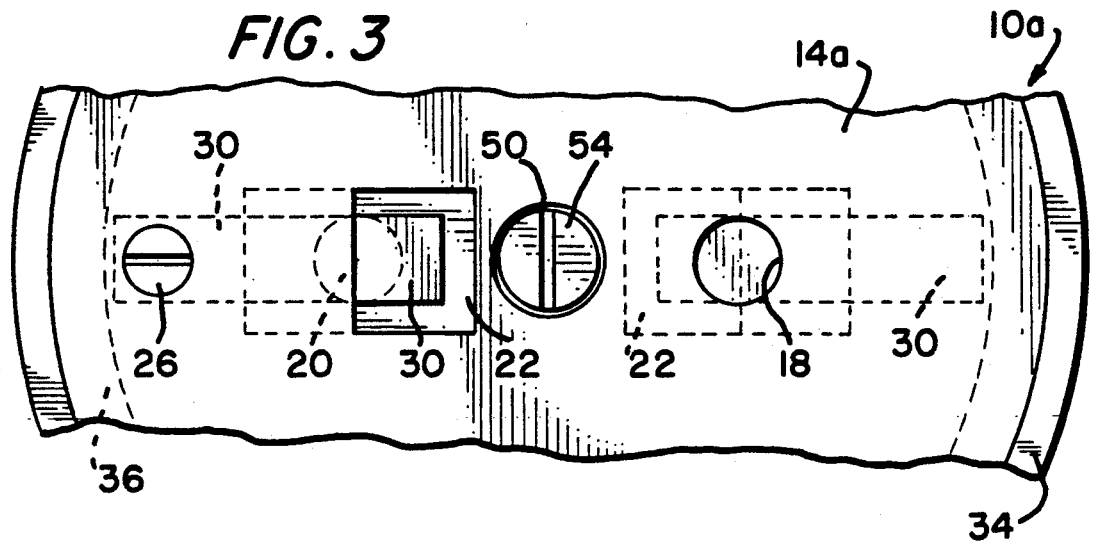
FIG. 3 is a partial plan view of the FIG. 2 embodiment.

FIGS. 2 and 3 depict an alternative embodiment 10a of the novel valve assembly in which the plates 14a and 16a thereof are identical. Each plate 14a and 16a has a circular recess 50 which receives a circular nut 52 in the latter, and a cooperating, circular-headed bolt 54 in the former.

Plates 14a and 16a are simply mirror-imaged, or reversed, one from the other. Self-evidently, then, only one form of plate needs to be fabricated to construct the valve assembly 10a. Too, all other components therein are identical. The stocking requirements for the novel valve assembly has, by my teaching herein, been made simple. Too, the novel valve assembly is not difficult to disassemble, for maintenance and or parts replacement.

While I have described my invention in connection with specific embodiments thereof, it is to be clearly understood that this is done only by way of example and not as a limitation to the scope of my invention as set forth in the objects thereof and in the appended claims.

I claim:

1. A valve assembly, for a fluid-handling machine, comprising:
   a valve body;
   said body having inlet and discharge ports formed therein; and
   valving elements confined within said body; wherein said body comprises a pair of substantially identical plates coupled together; and further including
   means fastened to each of said plates, and in penetration of said valving elements, holding said valving elements in place; and wherein
   each of said plates has a tapped hole formed therein;
   each of said valving elements has a hole formed therein; and
   said holding means comprises a fastener threadedly engaged with said tapped hole and having a shank portion engaged with said hole in said element.

2. A valve assembly, according to claim 1, wherein:
   each of said plates further has a port and a void formed therein, and a ramp surface at one side of said void.

3. A valve assembly, according to claim 1, wherein:
   said plates are coupled together in spaced apart planes; and
   said valving elements are interposed between said plates.

4. A valve assembly, according to claim 1, further including:
   sealing means interposed between said plates.

5. A valve assembly, according to claim 4, wherein:

said sealing means is interposed between said plates about the peripherey of said plates.

6. A valve assembly, for a fluid-handling machine, comprising:

a valve body;

said body having inlet and discharge ports formed therein; and valving elements confined within said body; wherein said body comprises a pair of substantially identical plates coupled together;

said plates are coupled together in spaced apart planes; and said valving elements are interposed between said plates; and further including means interposed between each of said valving elements and one of said plates urging said valving elements against the other of said plates.

7. A valve assembly, for a fluid-handling machine, comprising:

a valve body;

said body having inlet and discharge ports formed therein; and valving elements confined within said body; wherein said body comprises a pair of substantially identical plates coupled together; and further including sealing means interposed between said plates; wherein said sealing means is interposed between said plates about the periphery of said plates;

said sealing means comprises an annular seal; and said seal has a transverse portion which extends across said valve assembly, between said plates, along a diameter thereof.

* * * * *